Jan. 17, 1956  R. T. WENSTROM  2,731,121
ELECTRO-MECHANICAL CONTROL MECHANISM
Filed June 1, 1954  3 Sheets-Sheet 1

INVENTOR.
Richard T. Wenstrom
BY Darby & Darby
HIS ATTORNEYS.

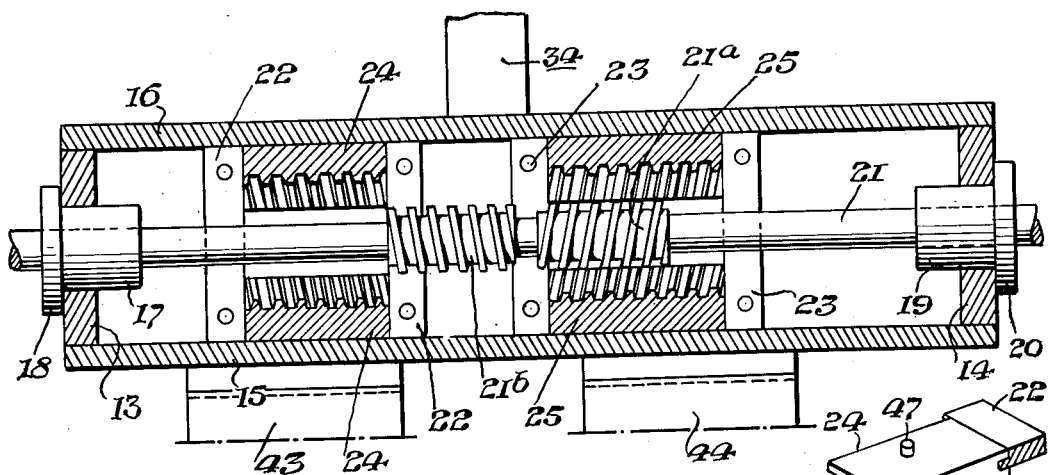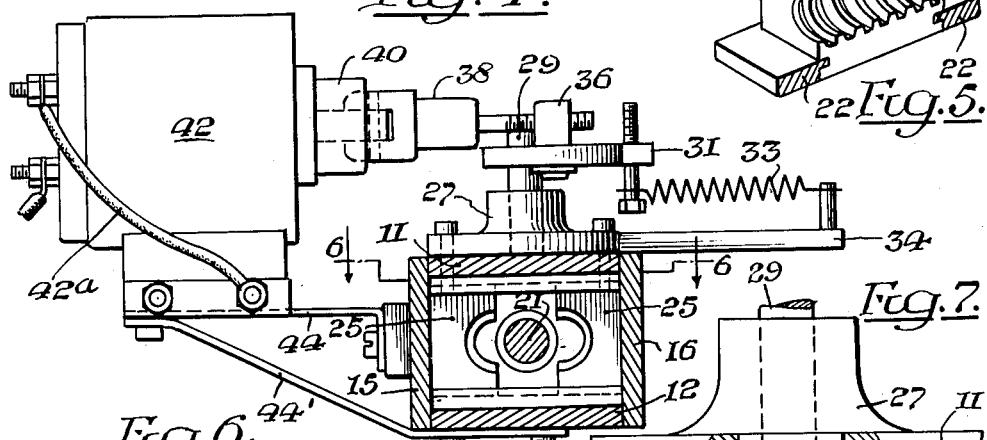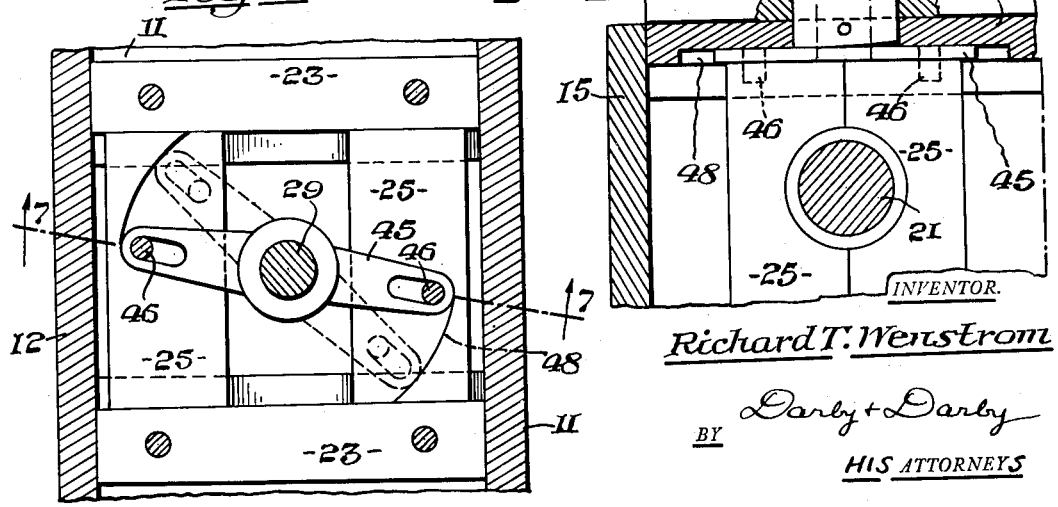

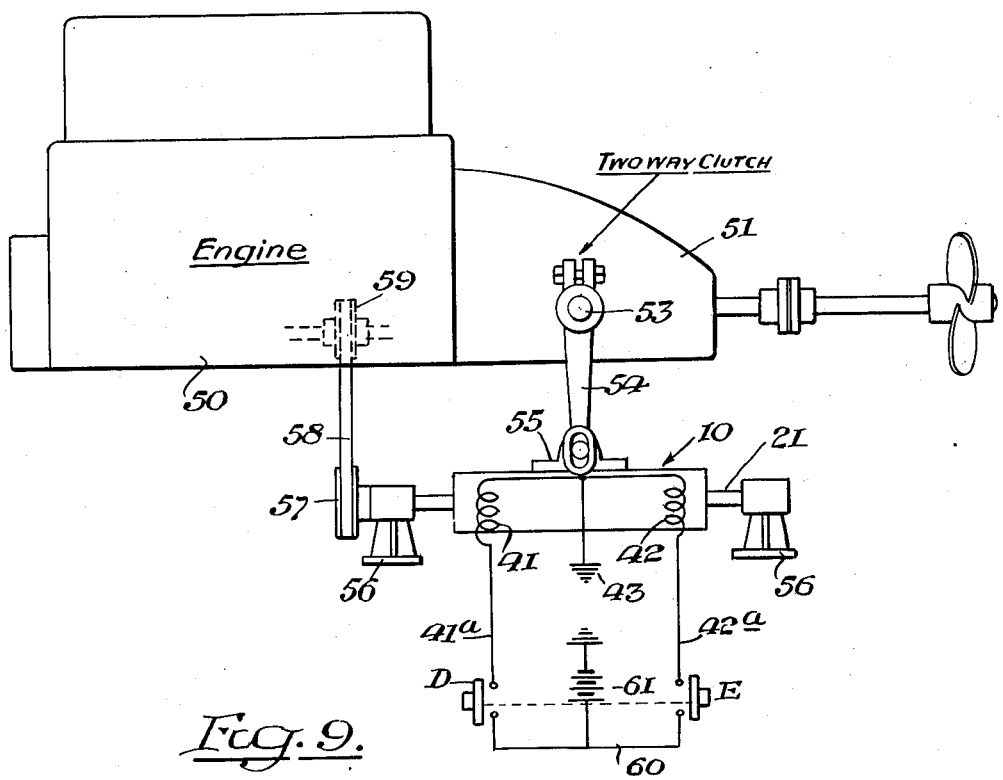
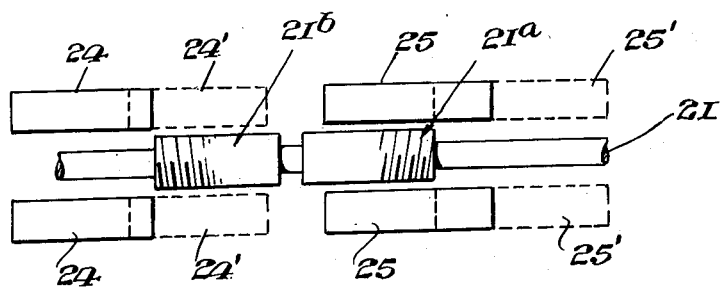

United States Patent Office 2,731,121
Patented Jan. 17, 1956

2,731,121

ELECTRO-MECHANICAL CONTROL MECHANISM

Richard T. Wenstrom, Mattapoisett, Mass., assignor of one-half to Bertel S. Blom, New Bedford, Mass.

Application June 1, 1954, Serial No. 433,633

12 Claims. (Cl. 192—94)

The object of this invention is to provide in combination with a power transmission system, means for controlling such system which in turn is under the control of manually operated selector mechanism.

Another object of this invention is to provide a power operator for a two-position power transmission element.

The full and more detailed objects of the invention will be apparent from the following disclosure of the embodiment thereof illustrated in the accompanying drawings.

In the drawings,

Figure 3 is a cross-sectional view taken on the line 3—3 of Figure 2;

Figure 4 is a cross-sectional view taken on the line 4—4 of Figure 1;

Figure 5 is a detailed perspective view of one of the half nuts forming part of the device, illustrating the manner of supporting it;

Figure 6 is a cross-sectional view taken on the line 6—6 of Figure 4;

Figure 7 is a cross-sectional view taken on the line 7—7 of Figure 6;

Figure 8 is a diagrammatic, schematic illustration of the combination of the operator of this invention with a power transmission system; and Figure 9 is a detailed, schematic illustration of the action of the half nuts and cooperating threaded shaft.

Figure 1:
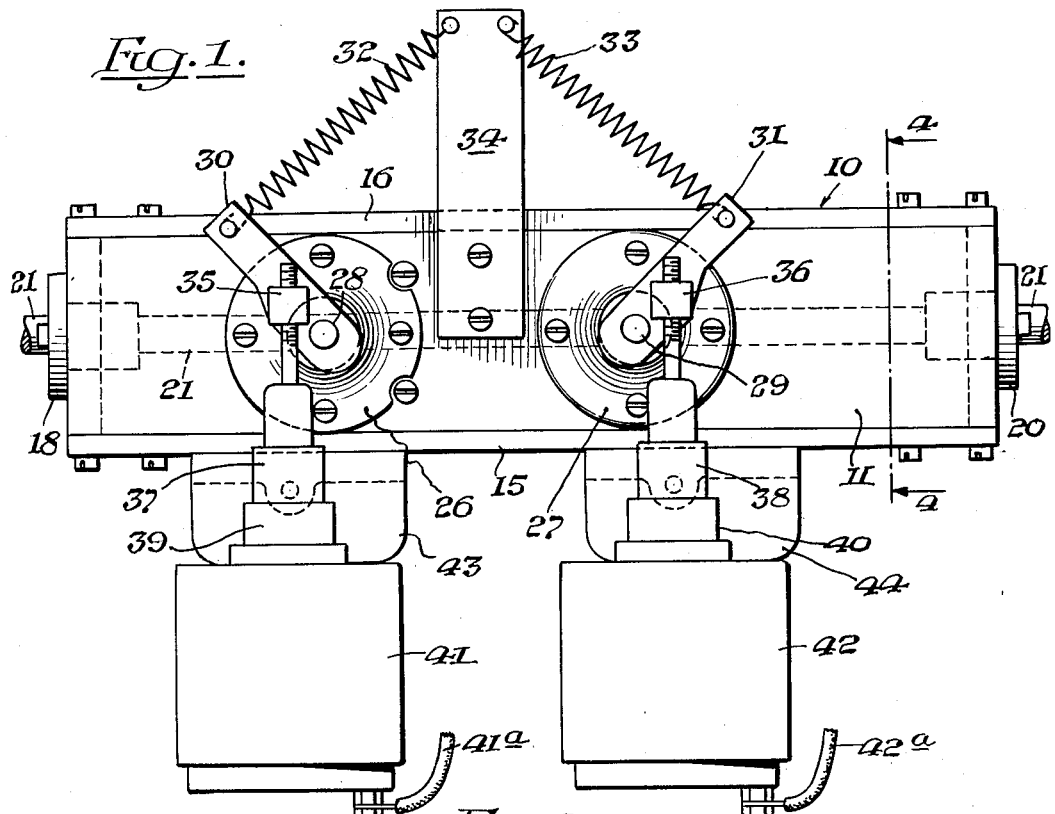
Figure 1 is a side elevational view of the electromechanical operator for actuating a control element of a power transmission system.

This invention will be described in connection with the actuation of a two-way clutch for a marine engine. It is understood, of course, as will be apparent as the description proceeds, that the mechanism of this invention is of much wider application. However, the illustrations selected for descriptive purposes provide a basis for a full understanding of the complete capabilities of the mechanism of the invention.

There are many known forms of power operators for controlling power transmission systems, many of which include electric motor operators which require special limit switches and complicated control circuits, frequently not dependable in use because of their complexity.

The general purpose of this invention is to provide a mechanical operator having a built-in or inherent motion limiting function which does not require complicated electrical circuits. As the invention is best understood by way of example, the embodiments illustrated in the attached drawings will be described.

The mechanical operator which is electro-magnetically controlled, is illustrated in full detail in the various figures. It comprises a long rectangular housing 10 which is composed of front and back plates 11 and 12, top and bottom plates 16 and 15, and end plates 13 and 14, all secured together by machine screws, as illustrated by way of example, to form a sealed housing which can contain the necessary lubricant. The end plates 13 and 14 are provided respectively with bushing bearings comprising sleeves 17 and 19 with integral flanges 18 and 20 respectively. These bushing bearings are mounted in aligned apertures in the end plates 13 and 14 and secured with their flanged ends in contact with the outer faces of the end wall by means of machine screws, as shown.

Journalled in the bushings 17 and 19 is a shaft 21 which is provided with two spaced sets of threads 21$^a$ and 21$^b$, which as illustrated in Figure 3, are of opposite hand. As will be appreciated by those skilled in the art, it is not important which set of threads is left hand and which set is right hand, the point being that they are of opposite hands.

Figure 2:
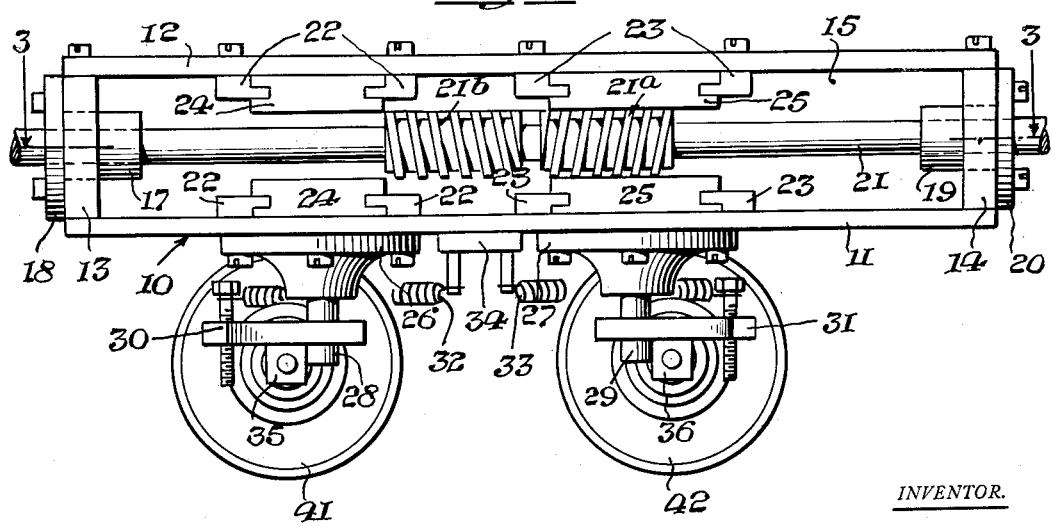
Figure 2 is a top plan view of the structure of Figure 1 with the cover plate of the main housing removed.

As can be clearly seen in Figures 2 and 5, pairs of half nuts 24 and 25 are provided for engagement with the threads 21$^b$ and 21$^a$ respectively. The half nut parts 25 are mounted for sliding movement towards and away from the cooperating threads in gibs 23, and similarly the half nut parts 24 are mounted in gibs 22. As shown in Figure 2, there are four gibs for each half nut pair, which are attached within the rectangular housing 10 by means of machine screws passing through the front and back walls, as illustrated. As is necessary, the half nut parts 25 are internally threaded with threads of the same hand as the threads 21$^a$ and the half nut parts 24 are likewise internally threaded in the same hand as the threads 21$^b$.

Mounted on the front plate 11, see Figures 1 and 2, are a pair of disc-like fixtures 26 and 27 in which are journalled short shafts 28 and 29 respectively, to which are adjustably attached the levers 30 and 31. Lever 30 is connected by means of a spring 32 and lever 31 by means of a spring 33, to an arm 34 which is anchored to the housing 10, as shown. Pivotally mounted on the levers 30 and 31 are a pair of nuts 35 and 36 which have adjustable threaded connection with the plungers of the solenoids 41 and 42. Plunger 39 is pivotally connected to a fixture 37 which is threadedly connected to the pivot nut 35, and similarly, solenoid 42 has its plunger 40 pivotally connected to the fixture 38 which is threadedly connected to the nut 36. The ungrounded terminal of the winding of the solenoid 41 is provided with a lead 41$^a$ and similarly the winding 42 is provided with the lead 42$^a$.

The solenoid magnet structures 41 and 42 are supported on the housing 10 by means of depending brackets 43 and 44 respectively, the brackets being attached to the housing bottom wall 15, see Figure 4. These brackets are cross-braced in the manner illustrated by the bracing 44' for the bracket 44.

As is shown in Figures 6 and 7, the inner ends of the shafts 28 and 29, as illustrated in the case of shaft 29, are provided with a double ended lever. As illustrated in the case of shaft 29, this lever is the lever 45 which can oscillate in an arcuate recess 48 in the adjacent front wall 11. The ends of the lever 45 are provided with elongated apertures which cooperate with pins 46 rigidly mounted in the half nut sections 25 respectively. At this point it may be noted that in the case of shaft 29, spring 33 biases the shaft in a direction so as to move the double ended lever 45 to the position shown in Figure 3, that is with the half nut portions 25 completely disengaged from the threads 21$^a$. The construction is the same with respect to half nut portions 24, the inner end of shaft 28 being provided with a double ended lever like the lever 45, and simiuarly connected to the half nut parts 24 by means of pins 47. It might also be noted that the springs 32 and 33, when the solenoids 41 and 42 are de-energized, bias the shafts 28 and 29 and all the connected parts to half nut open position.

The application of the structure thus far described will be explained in connection with the operation of a two-way clutch for a marine engine, as illustrated in Figure 8. The engine is shown diagrammatically at 50 with which is associated a housing 51 within which is mounted the two-way clutch having an operating shaft 53 extending exteriorly of the housing. Adjustably secured to the end of the shaft 53 is a lever 54 which has a pin and slot connection with a bracket 55 secured to the top of the operator housing 10. The ends of the threaded shaft 21 projecting through the bearing bushings are journalled in a pair of bearing fixtures 56 which are attached to any suitable adjacent support. One terminal of each winding is provided with the common ground 43, the other terminal, connected to the lead 41ª connects to one of the fixed contacts of a switch D, and the other terminal of the solenoid 42 is connected by the lead 42ª to one of the fixed contacts of the switch E. The other fixed contacts of switches D and E are provided with a common lead 60 connected to one side of a suitable current source of the solenoids, the other side of which is grounded, as shown. Preferably switches D and E are interconnected as illustrated by the dotted line, so that both switches cannot be closed at the same time.

Figure 9 diagrammatically illustrates the manner of cooperation of the half nuts with the threads of shaft 21, and it will be helpful in understanding the operation of the mechanism of Figure 8. Assuming that the engine 50 is operating as mentioned before, shaft 21 will be rotating. Housing 10 within which the shaft 21 rotates is supported by that shaft and is connected by means of the lever 54 to the clutch operating shaft 53. Assuming that the clutch is disengaged, in order to engage it switch E is closed, the winding of solenoid 42 is energized, causing its plunger 40 to descend, see Fig. 1, thereby imparting clockwise rotation to lver 31 against resistance of spring 33. There results a rotation of shaft 29 which causes the half nut parts 25 to slide in the gibs 23, and close upon the cooperating threads 21ª mounted on the rotating shaft 21.

Assuming with reference to Figure 8 that the clutch is engaged by counterclockwise rotation of lever 54, and assuming the proper hand for threads 21ª, it is apparent that so long as the half nut portions 25 engage the threads 21ª, housing 10 will move to the right (Figure 8). The parts are so arranged and proportioned that when the clutch is completely engaged the half nut portions 25 will run off of the threads 21ª. As soon as they run off of these threads, housing 10 will stop its rectilinear motion to the right, even though switch E is held closed. The clutch is now engaged and the propeller shaft 52 is being driven by the engine 50. The parts will remain in this position even upon opening of the switch E. When it is desired to disengage the clutch, switch D is closed, energizing solenoid 41, causing the half nut portions 24 to close on the threads 21ᵇ, which are of the opposite hand, with the result that the housing 10 moves back to the left (Figure 8). The clutch is completely disengaged when the half nut portions 25 ride off the threads 21ª. Thus the housing 10 stops and will remain in that position whether switch D is open or closed.

This action will be further understood by reference to Figure 9. It will be seen, as shown for example in Figures 2 and 3, that the half nut portions 25 are of greater axial length than the half nut portions 24. The cooperating threads 21ª and 21ᵇ are so positioned relative to the half nuts that for either extreme position of the clutch one of the half nuts is engageable with its threads. Thus, as shown in Figure 9, the half nut parts 24 have run off of the threads 21ᵇ, and the half nut portions 25 overlap the threads 21ª, that is, the half nut 24 is in the extreme left hand position, and is out of engagement with the threads 21ᵇ. At this time the half nut 25 will be in the full line position of Figure 9. When the parts are in the other extreme position, that is with the half nut 25 in the dotted position 25', the half nut 24 will be in the dotted position 24', which is an overlapped position with respect to the threads 21ᵇ. Thus the housing, and of course the half nuts which travel with it, will reach the extreme position in either direction when the particular half nut driving it runs off the cooperating threads. On the other hand, there is no position of the parts when neither half nut is engageable with its cooperating threads. This provides an electro-magnetically controlled operator having an inherent limiting action to insure movement of a device to be operated thereby to either of two extreme positions without danger of overrunning the mechanism and damaging it.

In describing the above device it has been assumed that the controlled clutch has but two positions, namely, an engaged and a disengaged position. In some instances, of course, the motor will drive a reversing gear and in this event the reversing gear will necessarily be manually operated. However, it is entirely possible to utilize this arrangement, without structural change, to engage either the forward or reverse gear and to achieve a disengaged position by energizing one of the two solenoids until and only until the control arm is midway between its two positions and the motor is disconnected from the drive shaft either through a direct connection or through the reverse gears. Such an occurrence is readily detected since the motor will tend to speed up at the time when it is completely disengaged from the propeller shaft.

While I have described a preferred embodiment of my invention it will be understood that the modifications indicated above as well as others may readily be made without departing from the spirit of the invention. I wish therefore to be limited not by the foregoing description but, on the contrary, solely by the claims granted to me.

What is claimed is:

1. In a control device for a clutch intermediate a motor and a load, in combination, a shaft continuously rotated by said motor, said shaft having threaded sections of opposite hand spaced therealong, pairs of half nuts threaded in opposite hand spaced along said shaft, the half nuts of each pair being located on opposite sides of said shaft and being movable toward and away from each other to engage said threaded sections, said pairs of half nuts being connected together to move relative to said shaft under drive of said threaded sections, means connecting one of said relatively movable parts to a clutch operator and means for moving the half nuts of a selected pair into engaging position.

2. In a control device for a clutch intermediate a motor and a load, in combination, a shaft continuously rotated by said motor, said shaft having threaded sections of opposite hand spaced therealong, pairs of half nuts threaded in opposite hand spaced along said shaft, the half nuts of each pair being located on opposite sides of said shaft and being movable toward and away from each other to engage said threaded sections, said pairs of half nuts being connected together to move axially of said shaft together under drive of said threaded sections, means connecting said pairs of half nuts to a clutch operator and means for moving the half nuts of a selected pair into engaging position.

3. A device as claimed in claim 2, characterized in that one pair of said half nuts is longitudinally positioned to engage said corresponding threaded section of said shaft when the other pair of said half nuts is beyond engaging position.

4. A device as claimed in claim 2, characterized in that the axial length of one threaded section of said shaft relative to the corresponding half nut pair differs from the length of the other threaded section relative to its corresponding half nut pair.

5. In a control device for a clutch intermediate a motor and a load, in combination, a shaft continuously rotated by said motor, said shaft having threaded sections of opposite hand spaced therealong, a housing mounted on said shaft for movement axially thereof, two pairs of half nuts mounted in said housing for axial movement therewith, means mounting the half nuts of each pair for movement toward and away from each other to engage and disengage corresponding ones of said threaded sections, a pair of solenoids mounted on said housing, means operated by said solenoids for moving corresponding half nuts into thread engaging position, means connecting said housing to the controlled clutch and electric circuit means for selectively energizing said solenoids.

6. A device as claimed in claim 5, characterized in that said half nut pairs are spaced along said shaft so that when one of said pairs of half nuts has been in engagement with a corresponding threaded portion of said shaft and has been moved by said shaft to position where it has run off said threaded portion, a second pair of half nuts is in position to engage a second threaded portion of said shaft, said second portion being of opposite hand to said first portion whereby engagement of said second pair of said half nuts will cause movement of said housing in the opposite direction until said second pair of half nuts runs off the threads of the corresponding threaded shaft portion.

7. A device as claimed in claim 5, characterized in that said half nut portions are mounted in gibs in said housing, and further characterized in that said half nut portions are provided with pins thereon, and crank arms are rotatably mounted on said housing, said crank arms having slots into which said pins extend and being oscillated by operation of corresponding solenoids.

8. A device as claimed in claim 5, characterized in that the axial length of said threaded shaft portions are the same and the axial length of the half nuts of one of said pairs is greater than the axial length of the half nuts of the other of said pairs.

9. A device as claimed in claim 8, characterized in that the axial length of the half nuts of one of said pairs is less than the axial length of the corresponding threaded shaft portion and the axial length of the second of said pairs of half nuts is greater than the axial length of the corresponding threaded shaft portion.

10. A control device for a clutch positioned intermediate a motor and its load, comprising, in combination, a housing, a shaft extending through said housing, said housing being adapted to move longitudinally along said shaft, said housing being provided with bearings in which said shaft rotates, threaded sections of opposite hand on said shaft, two pairs of gibs mounted in said housing, a pair of half nuts mounted in corresponding ones of each pair of gibs, said half nuts of one pair being threaded in opposite hand to those of the other pair, said half nuts of a pair being movable toward and away from said shaft for engagement with the corresponding threaded section thereof, bearing supports mounted on said housing adjacent each said pair of gibs, shafts mounted in said bearings, said shafts extending at right angles to said first-mentioned shaft, a crank arm mounted on each said shaft in said housing, a pin extending outwardly from each half nut, each said pin entering a slot in the corresponding crank arm, a second crank arm on each of said second-mentioned shafts external to said housing, a solenoid mounted on said housing adjacent each said crank arm, and means connecting each solenoid plunger to the corresponding external crank arm whereby selective energization of said solenoids moves said half nuts into engagement with a corresponding threaded shaft portion to cause said housing to move axially relative to said shaft.

11. A device as claimed in claim 10, characterized in that said means for selectively energizing said solenoids comprises a source of electrical current, a switch intermediate said source and each of said solenoids and a return connection to the opposite side of the source whereby operation of either of said switches causes energization of the corresponding solenoid.

12. A device as claimed in claim 10, characterized in that said housing is connected to a clutch operating lever whereby movement of said housing relative to said shaft causes engaging and disengaging movement of said lever and the clutch.

References Cited in the file of this patent

UNITED STATES PATENTS

| | | |
|---|---|---|
| 1,409,090 | Glasser | Mar. 7, 1922 |
| 1,918,587 | Bryant | July 18, 1933 |
| 2,180,470 | Jaeger et al. | Nov. 21, 1939 |
| 2,550,131 | Wodetzky | Apr. 24, 1951 |
| 2,604,788 | Hauber | July 29, 1952 |